United States Patent
Freedman

(10) Patent No.: US 9,305,190 B2
(45) Date of Patent: Apr. 5, 2016

(54) ANTI-TAMPER DEVICE FOR INTEGRATED CIRCUITS

(76) Inventor: Graeme J. Freedman, Turramura (AU)

( * ) Notice: Subject to any disclaimer, the term of this patent is extended or adjusted under 35 U.S.C. 154(b) by 379 days.

(21) Appl. No.: 13/519,654

(22) PCT Filed: Jul. 15, 2011

(86) PCT No.: PCT/IB2011/002331
§ 371 (c)(1),
(2), (4) Date: Jan. 31, 2013

(87) PCT Pub. No.: WO2012/010971
PCT Pub. Date: Jan. 26, 2012

(65) Prior Publication Data
US 2013/0125250 A1   May 16, 2013

Related U.S. Application Data

(60) Provisional application No. 61/365,349, filed on Jul. 18, 2010.

(51) Int. Cl.
| | |
|---|---|
| G06F 1/26 | (2006.01) |
| G06F 11/00 | (2006.01) |
| G06F 21/86 | (2013.01) |
| H01L 23/00 | (2006.01) |
| F41H 11/06 | (2006.01) |
| F42C 7/00 | (2006.01) |
| G06F 12/14 | (2006.01) |
| H02N 6/00 | (2006.01) |
| F16B 41/00 | (2006.01) |

(52) U.S. Cl.
CPC ............. *G06F 21/86* (2013.01); *F41H 11/06* (2013.01); *F42C 7/00* (2013.01); *H01L 23/57* (2013.01); *F16B 41/005* (2013.01); *H01L 2924/0002* (2013.01)

(58) Field of Classification Search
None
See application file for complete search history.

(56) References Cited

U.S. PATENT DOCUMENTS

| | | | | |
|---|---|---|---|---|
| 4,236,463 | A | * 12/1980 | Westcott | ............ E05G 1/14 109/33 |
| 4,804,826 | A | 2/1989 | Hertzen et al. | |
| 4,812,670 | A | 3/1989 | Goulet | |
| 4,853,676 | A | 8/1989 | Kitts | |

(Continued)

FOREIGN PATENT DOCUMENTS

| | | |
|---|---|---|
| WO | WO-95/28542 A1 | 10/1995 |
| WO | WO-98/38407 A1 | 9/1998 |

*Primary Examiner* — Dede Zecher
*Assistant Examiner* — Trang Doan
(74) *Attorney, Agent, or Firm* — Novak Druce Connolly Bove + Quigg LLP

(57) ABSTRACT

An anti-tamper device (10) for one or more integrated circuits (12) includes a firing assembly (14) and a breach assembly (16). The firing assembly (14) includes a contained energy source (24), an impact element (26) and a breach assembly (16). The breach assembly (16) is configured to house one or more integrated circuits (12) and a propellant charge (30). Upon an attempt to improperly remove or dislodge an integrated circuit (12) from the anti-tamper device (10), the contained energy source (24) is actuated. The energy source (24) propels the impact element (26) against the propellant charge (30), causing the charge to ignite. The resultant forces from the impact element (26) and ignition of the charge imparts a shock wave through the anti-tamper device (10). This shock wave induces spalling of the integrated circuit (12) such that the circuit is physically altered and rendered unreadable.

10 Claims, 7 Drawing Sheets

(56) References Cited

U.S. PATENT DOCUMENTS

| | | | |
|---|---|---|---|
| 5,736,777 A | 4/1998 | Shield et al. | |
| 5,775,235 A | 7/1998 | Lindskog et al. | |
| 5,877,547 A | 3/1999 | Rhelimi | |
| 6,192,802 B1 * | 2/2001 | Baginski | F42B 3/13 102/202.2 |
| 6,259,366 B1 | 7/2001 | Lindskog et al. | |
| 6,264,108 B1 | 7/2001 | Baentsch | |
| 6,379,988 B1 * | 4/2002 | Peterson | B81C 1/00333 257/E21.502 |
| 6,421,013 B1 * | 7/2002 | Chung | G06K 19/07749 235/441 |
| 6,926,204 B2 | 8/2005 | Vacherand et al. | |
| 7,263,190 B1 * | 8/2007 | Moritz | G06F 21/6245 380/258 |
| 7,532,027 B2 | 5/2009 | Lazaravich et al. | |
| 2002/0186131 A1 | 12/2002 | Fettis | |
| 2006/0136752 A1 * | 6/2006 | Miller | G06F 21/60 713/194 |
| 2008/0307992 A1 * | 12/2008 | Mohler | F42B 3/00 102/202.6 |
| 2010/0064371 A1 * | 3/2010 | Mostovych | G06F 21/554 726/26 |
| 2011/0031982 A1 | 2/2011 | Leon et al. | |
| 2012/0068326 A1 * | 3/2012 | Das | H01L 23/42 257/687 |

* cited by examiner

ANTI-TAMPER DEVICE FOR INTEGRATED CIRCUITS

PRIORITY

This application is a national stage application under 35 U.S.C. §371, PCT/IB2011/002390, filed Jul. 15, 2011, which claims priority to U.S. Provisional Patent Application Ser. No. 61/365,349, filed on Jul. 18, 2010. The disclosures of the aforementioned priority applications are incorporated herein by reference in their entirety.

BACKGROUND OF THE INVENTION

1. Field of the Invention

The field of the present invention relates to an anti-tamper device for integrated circuits, particularly an anti-tamper device that physically alters and renders unreadable one or more integrated circuits.

2. Background

Often, one of the first steps taken by hackers, in their attempts to access embedded keys and data contained in integrated circuits, is hardware disassembly. Using readily available tools, techniques and information, many electronic devices and systems are easily disassembled. In most instances, however, hackers fail to encounter any type of anti-tamper device that prevents or deters hardware disassembly.

Although integrated circuits implement countermeasures designed to digitally or electronically destroy embedded keys and data, thwarting attacks with these types of countermeasures involves continued research and expense. In addition, due to external forces, such as reducing manufacturing costs and marketing timelines, designers of digital and electronic countermeasures are further disadvantaged. Therefore, using digital and electronic countermeasures alone often means hackers are able to access sensitive data stored within integrated circuits.

Despite being recognized as a better method of preventing access to integrated circuits, few, if any, systems use physical destruction methods as countermeasures. This is perhaps, in part, due to the potential harm to surrounding components and difficulties associated with commercially implementing known physical destruction methods.

Embedded keys and data contained within integrated circuits are not easily destroyed. Because even small fragments can contain sensitive data, scratching or cutting the surface of an integrated circuit is generally ineffective. Nonetheless, given the effectiveness of physical destruction methods in thwarting attacks and the ineffectiveness of digital and electronic countermeasures, there is a clear need for improved anti-tamper devices.

SUMMARY OF THE INVENTION

The present invention is directed toward an anti-tamper device for integrated circuits. The anti-tamper device includes a firing assembly having a contained energy source and an impact element. The device further includes a breach assembly having an integrated circuit and a propellant charge.

Upon an attempt to improperly remove or dislodge the integrated circuit from the anti-tamper device, the contained energy source is actuated. The energy source propels the impact element against the propellant charge, causing the charge to ignite. The resultant forces from the impact element and ignition of the charge imparts a shock wave through the anti-tamper device. This shock wave induces spalling of the integrated circuit such that the circuit is physically altered and rendered unreadable.

BRIEF DESCRIPTION OF THE DRAWINGS

The drawings described herein are for illustrative purposes only and are not intended to limit the scope of the present disclosure. In the drawings.

DETAILED DESCRIPTION

Figure 1:
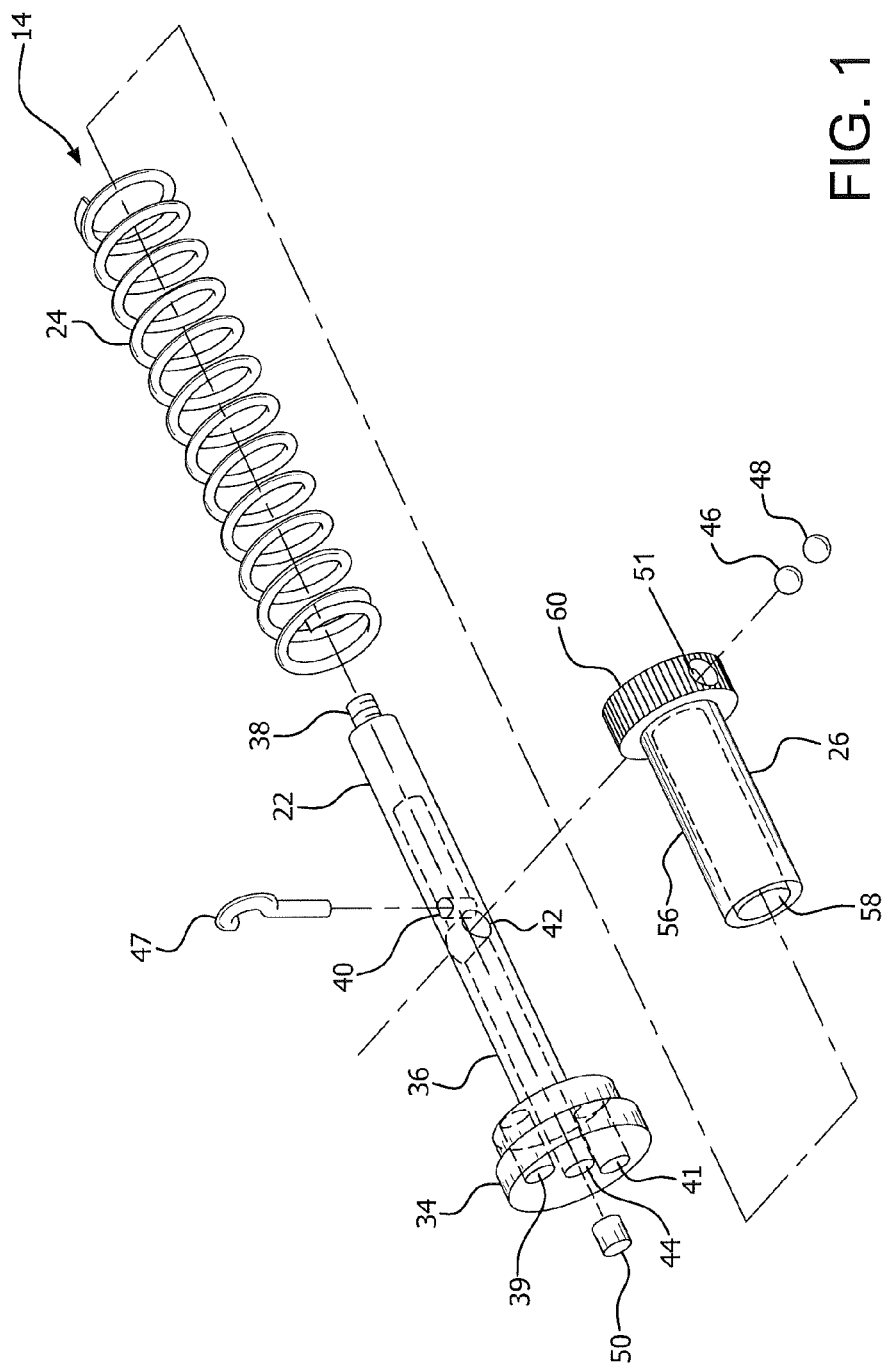
FIG. 1 is an exploded view of a firing assembly.
Figure 2:
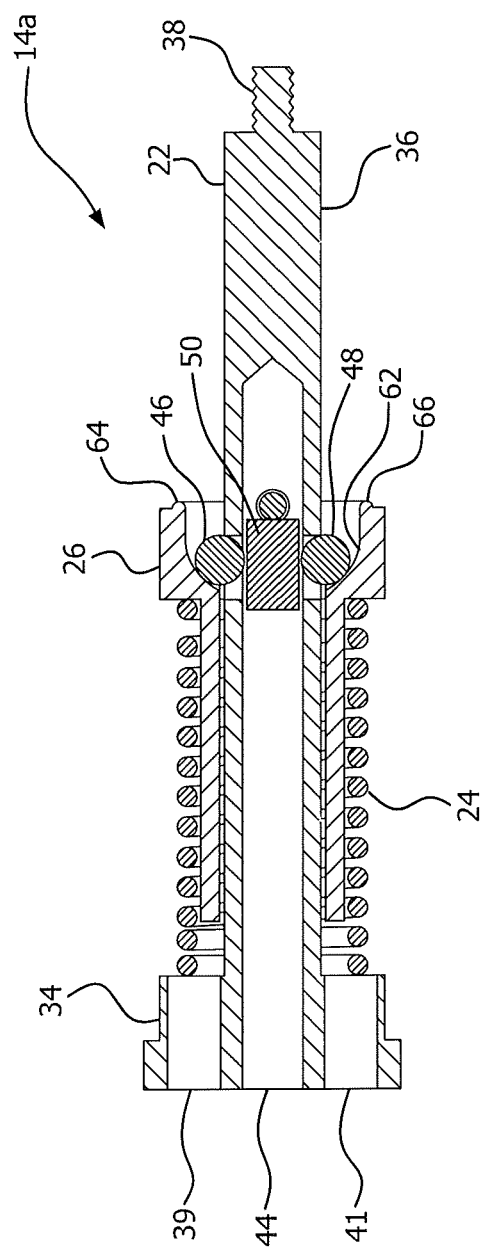
FIG. 2 is a cross-sectional view of an assembled firing assembly in its Primed State.

Turning in detail to the drawings, FIGS. 1-7 illustrate the assembly of an anti-tamper device 10 for an integrated circuit 12. The anti-tamper device 10 includes a firing assembly 14 (FIGS. 1 and 2), a breach assembly 16 (FIG. 3), an inner containment chamber 20 and an outer containment chamber 80. The firing assembly 14 includes, in part, a receiver element 22, a contained energy source 24, and an impact element 26, as shown in FIGS. 1 and 2. The breach assembly 16 includes a breach element 18 configured to house the integrated circuit 12, a circuit interface 28, and a propellant charge 30, as shown particularly in FIG. 3.

When actuated, the contained energy source 24 propels the impact element 26 such that it ignites the propellant charge 30. Upon ignition of the charge, a localized shock wave is imparted through the anti-tamper device, causing spalling of the integrated circuit 12. This spalling renders the integrated circuit unreadable. "Spalling," as used herein, is broadly defined as breaking, shattering, disintegrating, splitting, chipping, or any other method that physically alters at least a portion of the integrated circuit such that the circuit is rendered unreadable.

FIG. 1 shows an exploded view of the firing assembly 14. Primary components of the firing assembly 14 include a receiver element 22, a contained energy source 24, and an impact element 26. The receiver element 22 provides alignment and support for other components within the anti-tamper device. The receiver element 22 includes a stepped end section 34, a shaft section 36, and a nose section 38. As further described below, holes 40, 42 and receiver well 44 are also provided within the receiver element 22 for initial positioning of the energy source 24 and the impact element 26, using locking elements 46, 48 and locking pin 50. Vent holes 39, 41 are also preferably included within the stepped end section 34 of the receiver element 22.

The energy source 24 is considered "contained" because it is not dependent upon external sources of energy, which are typically connected by wires or cables. In preferred configurations, the contained energy source 24 is a spring, imparting sufficient force to crimp the rim of the propellant charge and cause its ignition. While other types of energy sources are contemplated, preferable energy sources are capable of converting potential energy to kinetic energy upon their release from a compressed state.

The impact element 26 includes a shaft section 56 having a through-hole 58 and a head section 60 having an annular groove 62. The head section 60 preferably has a raised edge or surface 64 (FIG. 2) on its top face 66. The raised edge or surface 64 may be used to facilitate ignition of the propellant charge 30.

Three primary Assembly States are reached during preparation of the anti-tamper device: (1) the Primed State; (2) the Loaded State; and (3) the Set State.

To reach the primed state assembly 14*a* (FIGS. 2 and 3), the receiver element 22, energy source 24, and impact element 26 are positioned. Preferably, the energy source 24 and the impact element 26 are first pressed toward the stepped end section 34 of the receiver element 22 such that priming pin 47 (FIG. 1) may be inserted into pin hole 40. Thereafter, locking element access hole 51 is placed in alignment with receiver locking hole 42 for positioning of locking elements 46, 48. A first locking element 46 is initially placed into the receiver locking hole 42. Thereafter, locking pin 50 is inserted into the receiver well 44 and positioned against priming pin 47. A second locking element 48 is then placed into the receiver locking hole 42. In preferred configuration, the locking elements 46, 48 have a spherical outer periphery and the locking pin 50 has a circular cross-section.

When aligned, locking elements 46, 48 simultaneously rest on groove 62, located within the head section 60 of impact element 26, and in receiver locking hole 42. In this aligned position, priming pin 47 prevents movement of the impact element, while it is in a pressed position. Once assembled, the impact element may be turned approximately 90 degrees and the priming pin 47 removed, leaving the assembly in the Primed State. A Primed State Assembly 14*a* is shown in FIG. 2.

Then, the impact element 26 is rotated to ensure that locking elements 46, 48 are contained within the assembly and the priming pin 47 is removed.

Next, to reach the Loaded State Assembly 92 (FIG. 4), the Primed State Assembly 14*a*, the breach assembly 16, and the inner containment chamber 20 are positioned. The breach assembly 16 includes an integrated circuit 12, a breach element 18, a circuit interface 28, and a propellant charge 30. Breach element 18 includes a slot 70 configured to house one or more integrated circuits 12 and circuit interfaces 28.

Integrated circuits, as used herein, are broadly defined as memory devices, particularly devices based on integrated circuit technology, and including those with microprocessors or cryptographic processors. These devices may include any digital memory device having a small form factor, and specifically those that meet physical and electrical specifications for ISO/IEC 7810 ID-000 form factor (e.g. Subscriber Interface Modules (SIM) or Security Access Modules (SAM)) and ETSI TS 221 V9.0.0 (Mini-UIC). In addition, these devices may include generic secured or unsecured memory devices, such as MultiMediaCard (MMC), SecureDigital (SD), CompactFlash (CF), or other digital memory device formats with either standardized or proprietary form factors similar to those used in digital cameras and like devices.

The circuit interface 28 is preferably a frangible interface with physical and electrical interface connections, which are compatible with any of the aforementioned integrated circuit types. The circuit interface also includes a section 72 adapted for connection with a cable and/or wire 74. (See FIG. 3).

Breach element 18 includes a recessed slot 73 or other suitable area configured for positioning of a cable and/or wire 74. (See FIG. 3). The type of cable or wire used is configured to transmit and receive electrical signals from the integrated circuit to any external device. Such devices include, but are not limited to, transit systems, banking systems, physical access systems (e.g. door access systems), computers, and networks. Network types include Global System for Mobile Communications (GSM), General Packet Radio Service (GPRS), Code Division Multiple Access (CDMR), Enhanced Data for Global Evolution (EDGE), Ethernet ISO/IEEE 802-3 networks, and other devices configured to interface with and/or access data from integrated circuits.

Preferably, the integrated circuit 12 and circuit interface 28 are connected and placed within the slot 70 or other suitable area within the breach element 18. These elements 12, 28 are specifically positioned in the breach element 18 adjacent to cross ports 76. (See FIG. 3). These cross-ports are aligned with gas port 78 and propellant charge chamber 82, as described below.

The breach element 18 further includes a propellant charge chamber 82 for housing a propellant charge 30. The gas port 78 and the propellant charge chamber 82, however, are both configured to receive propellant charge 30.

Propellant charge, as used herein, is broadly defined as any type propellant charge that can be contained within a pyrotechnic cartridge. Preferably, these charges are powder actuated and commercially available from building suppliers such as those used for driving nails and other types of fastening devices. These types of charges are provided in a variety of powder level and calibers. Contemplated charges include those using smokeless powder or other low explosive materials which burn rapidly such as those manufactured by Illinois Tool Works, Inc. and the Hilti Corporation. When a surface strikes the base of the cartridge, the charge is activated by an impact sensitive primer compound. After activation off the charge, the burning propellant builds pressure within the cartridge and thereafter releases gases, imparting a shock wave throughout the breach assembly.

Figure 3:
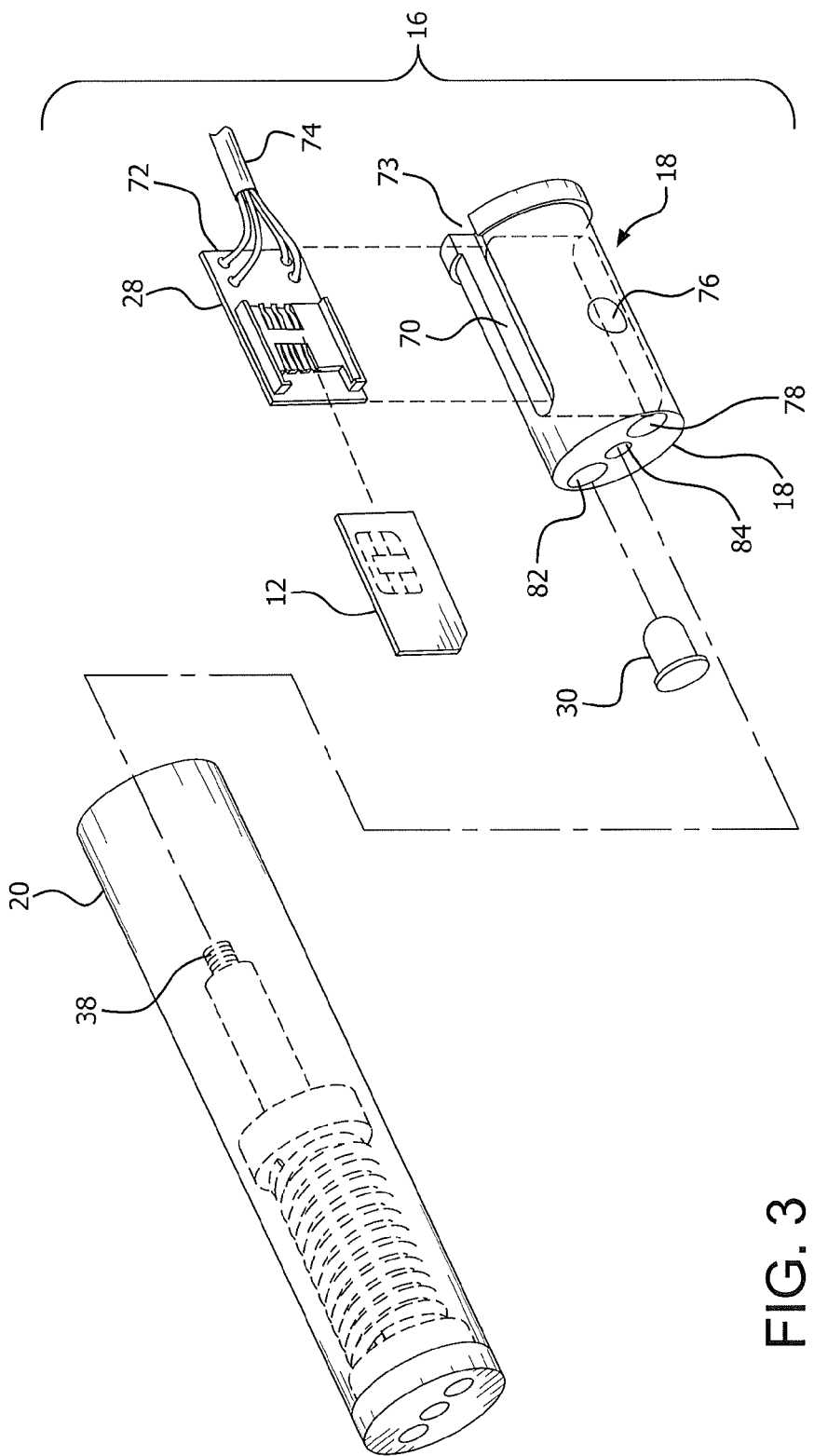
FIG. 3 is an exploded view of a firing assembly in its Primed State, an inner containment chamber, and a breach assembly.
Figure 4:
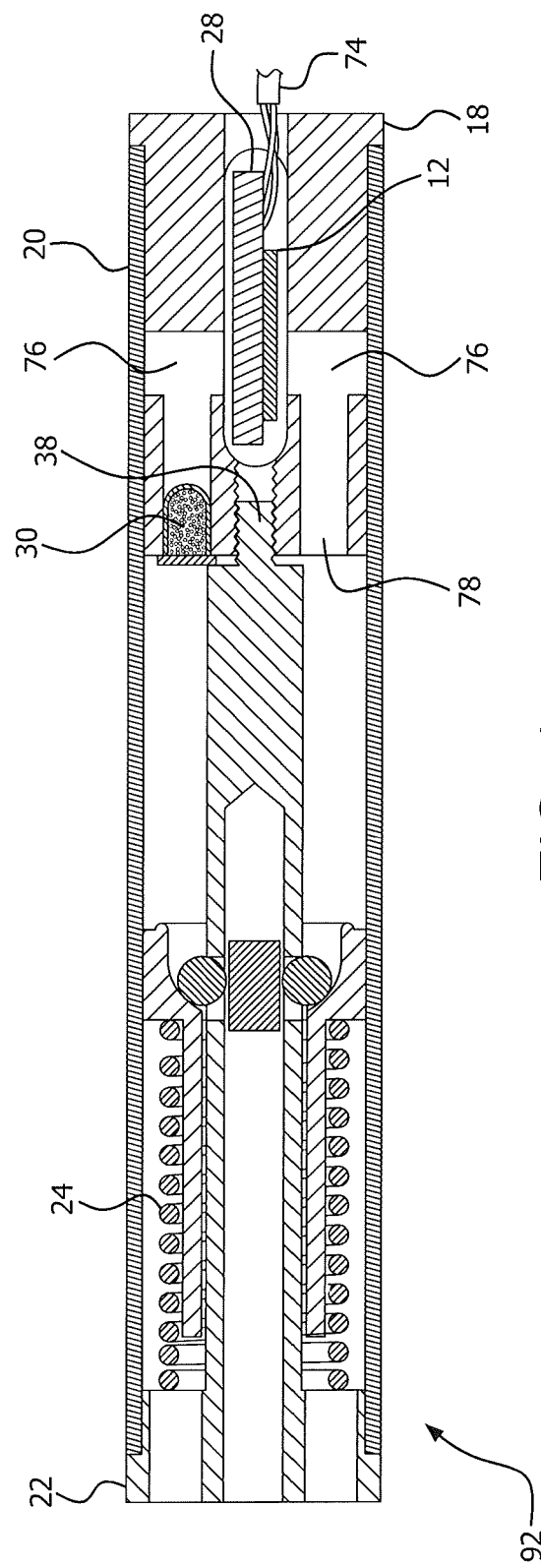
FIG. 4 is a sectional view of a Loaded State assembly.
Figure 5:
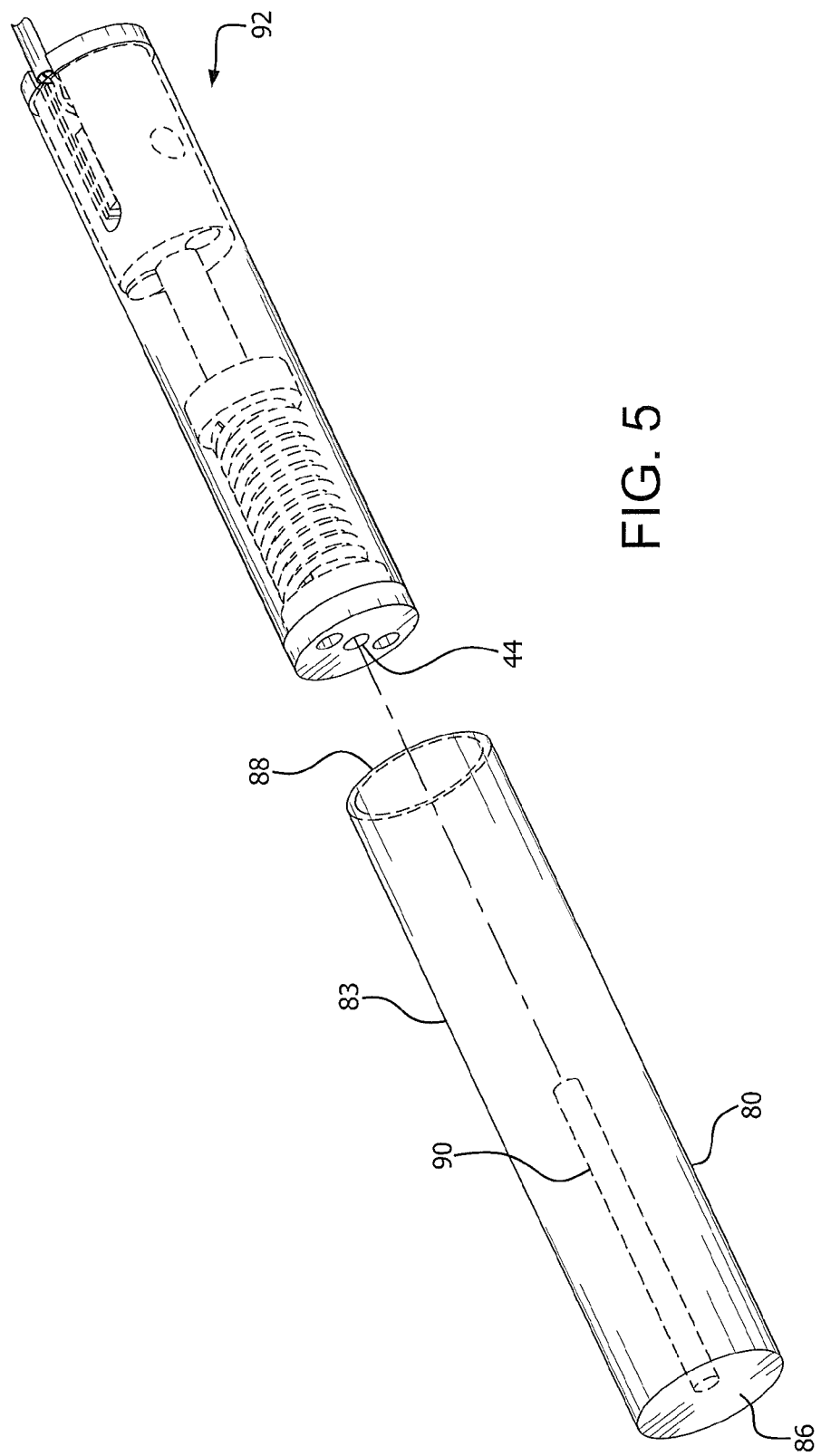
FIG. 5 is an exploded view of a Loaded State assembly and an outer containment chamber.

After the breach assembly 16 is assembled, it is placed into inner containment chamber 20, as shown particularly in FIGS. 4 and 5. The inner containment chamber 20 is preferably a sleeve of sufficient length to substantially cover both the firing assembly 14 and the breach assembly 16. This assembly is then coupled to the Primed State assembly 14*a*, as shown particularly in FIG. 5. Preferably, the nose section 38 (FIGS. 3 and 4) is configured to mate with hole 84 (FIG. 3). More preferably, the nose section 38 and the hole 84 have mating threads 85. During this assembly, an anaerobic locking compound may also be included on the threaded sections. A cross-sectional view of the Loaded State Assembly 92 is shown in FIG. 4.

Figure 6:
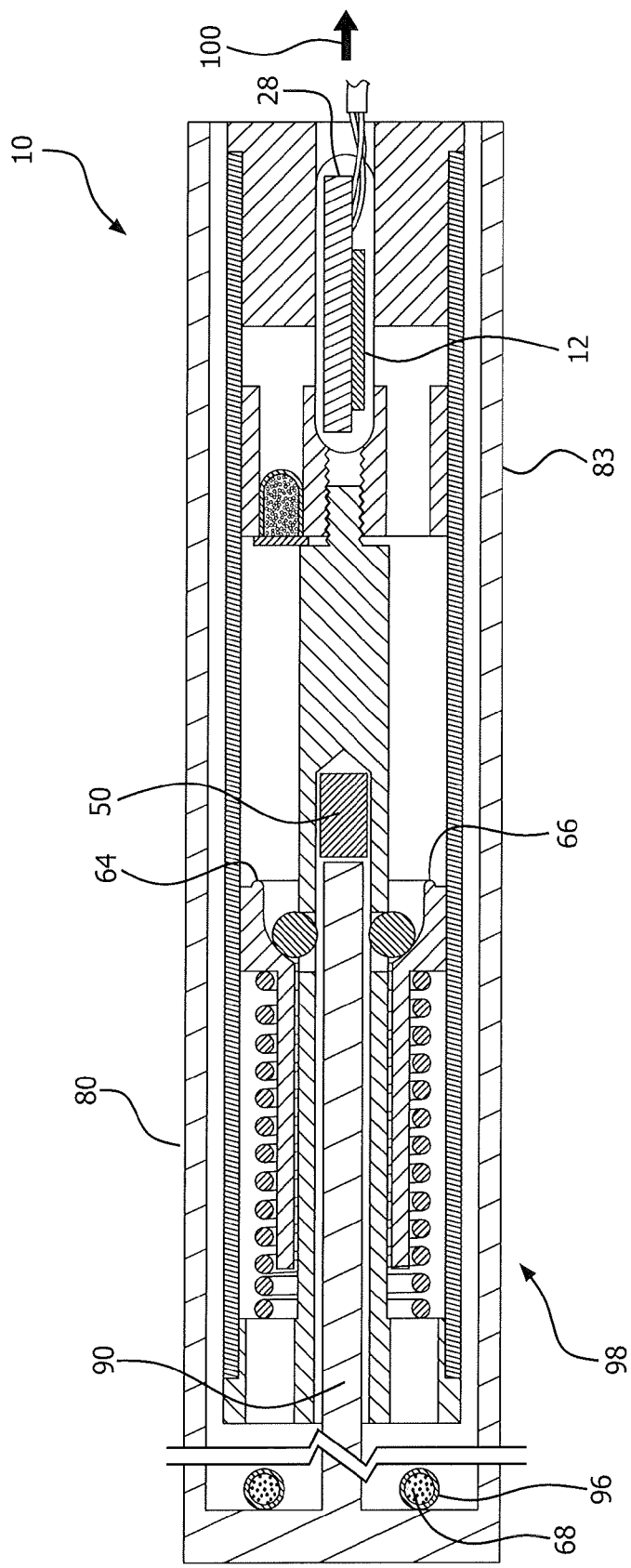
FIG. 6 is a sectional view of a Set State assembly.

As shown in FIGS. 5 and 6, to reach the Set State Assembly 98 (FIG. 6), the outer containment chamber 80 is coupled to the Loaded State Assembly 92. The outer containment chamber 80 is preferably a tube having a closed end 86 and an open end 88. Included within the chamber 80 is tripping mechanism 90. Preferably, the tripping mechanism 90 is an integral part of the tube; however, it may be one or more separate components. In a preferred configuration, the tripping mechanism 90 is an elongated element having a circular cross-section. Preferably, the circular cross-section has about the same diametrical cross-section as locking pin 50 (FIG. 6).

Figure 7:
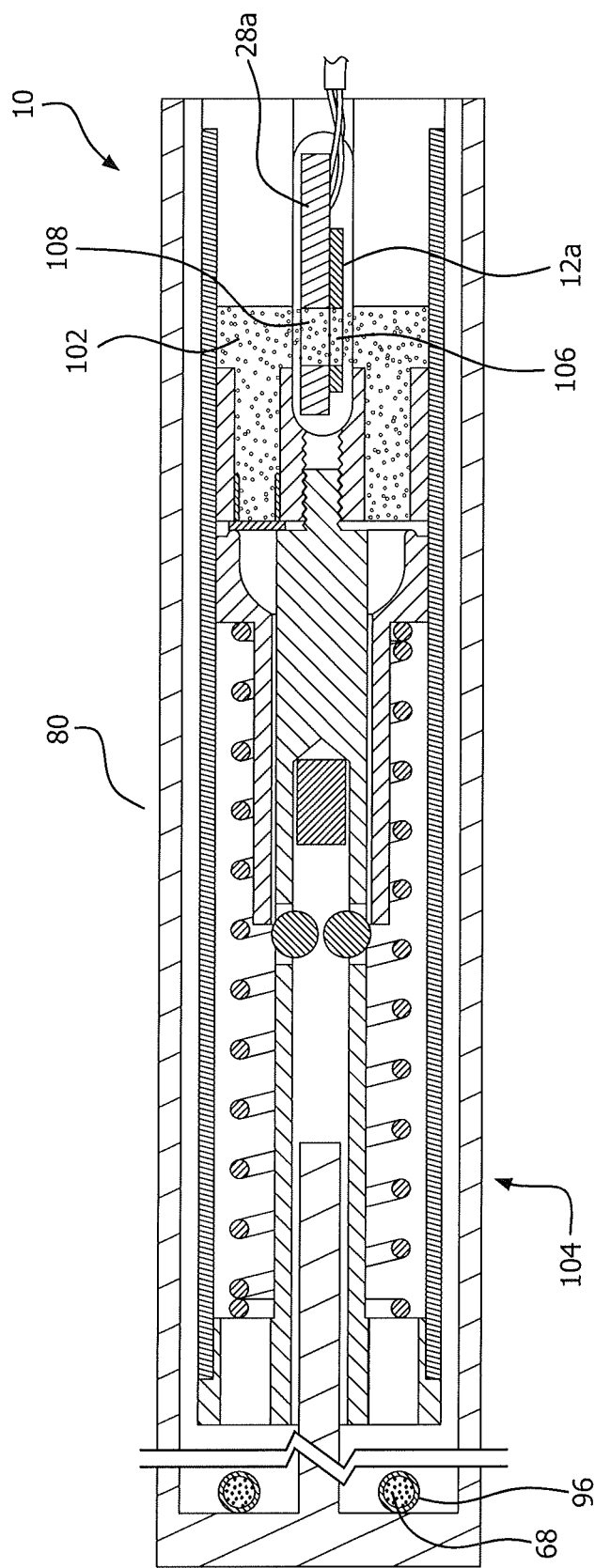
FIG. 7 is a sectional view of the anti-tamper device shown in its Fired State.

Optionally, the outer containment chamber 80 may also include a forensic identifying material 68 (FIGS. 6 and 7) disposed within the chamber and preferably contained within in a frangible package 96 (FIGS. 6 and 7). Preferably, the frangible package 96 has an annular or doughnut-like shape. Any other shape, however, may be suitable. Upon improper removal of the integrated circuit 12 and/or the integrated circuit interface 28 from the Set State Assembly 98, this material will be released upon a hacker or unauthorized intruder for identification purposes, as described below. Contemplated forensic materials include powders or liquids such as residues from propellant charges and dyes. Any identifying material that is suitable for deposit onto a hacker or unauthorized intruder, however, may be utilized.

Under actual conditions, the outer containment chamber 80 is placed separately in an area (not shown), which is in proximity to a transit system, banking system, physical access system, a retail terminal, network, or any other type of system that uses integrated circuits. This area may be an opening, which is drilled into the ground or any type of building structure or furniture structure. Preferably, the outer containment chamber 80 is coupled to a predetermined area using methods such as grouting, gluing, or welding.

Alternatively, the outer containment chamber 80 may have an outer surface 83 that is configured to securely bite into or adhere to building structures or furniture structures made from plastic, concrete, metal, plaster, wood, foam, composite material or a building structure or furniture structure manufactured from a combination of these materials. Outer containment chamber 80 may also be integrally pre-molded into a building structure or furniture structure or a section thereof.

After positioning of the outer containment chamber 80 into the ground or the building structure, the Loaded State Assembly 92 is aligned with the outer containment chamber 80. Specifically, the tripping mechanism 90 is positioned within the receiver well 44 such that locking pin 50 is displaced, as shown in FIG. 6.

The Set State Assembly 98 of anti-tamper device 10 is released or triggered when an attempt is made to remove or dislodge an integrated circuit 12 and/or the integrated circuit interface 28 from position within the breach assembly 16. Under these circumstances one or more forces 100 is/are applied to the Set State assembly 98, during an attempt to remove or dislodge the integrated circuit 12 and/or the circuit interface 28.

For example, when a hacker or unauthorized intruder pulls on the extending cable or otherwise attempts to remove or dislodge the circuit from its Set State, the following can occur: (1) the triggering mechanism is withdrawn from the receiver well; (2) the locking elements drop into the receiver well, (3) the energy source (spring) and the impact element are released; (4) the impact element accelerates, propelling toward the breaching assembly and contacting and igniting the propellant charge.

The impact element 26 contacts the propellant charge 30 and the breaching assembly with sufficient impact force such that a shock wave is transmitted through the anti-tamper device 10. The resultant forces from the impact element 26 and the released gases 102 (FIG. 7) from the propellant charge 30 induce spalling of the integrated circuit 12 and the circuit interface 28. These forces, however, do not irreparably damage other components of the device. As such, the device may be reassembled and reused, after an initial triggering of the device, by placement of propellant charge, integrated circuit, and circuit interface within the breach assembly.

A Fired State Assembly 104, showing the physically altered integrated circuit 12a and circuit interface 28a is shown in FIG. 7. After impact of the resultant forces, both the integrated circuit and the circuit interface have breaches 106, 108. The physical alteration of the integrated circuit 12a is such that it is rendered unreadable.

Preferably, with the exception of the integrated circuit, circuit interface, the propellant charge and cables/wires, components of the anti-tamper device are manufactured from metallic materials. Preferable materials include steel, stainless steel, and various types of metallic alloys. However, such materials may include, but are not limited to, composites and plastics with sufficient impact resistance.

The anti-tamper device 10 may be configured to house additional integrated circuits and/or propellant charges. Further, one or more anti-tamper devices may be positioned in parallel or in series, depending upon the configuration of the system to which the device is coupled.

Thus, an anti-tamper device for one or more integrated circuits is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A breach assembly for an anti-tamper device for one or more integrated circuits, comprising:
    a breach element defining a propellant charge chamber to house a propellant charge,
    a slot in the breach element for receiving and housing the one or more integrated circuits, and
    cross ports communicating with the slot and aligned with the propellant charge chamber,
    whereby when the breach assembly is placed into a containment chamber and the propellant charge is activated, a shock wave is imparted throughout the breach element, including spalling of the one or more integrated circuits and thereby a breach of the one or more integrated circuits at the cross ports is created.

2. The breach assembly of claim 1, further comprising one or more integrated circuits housed in the slot in the breach element.

3. The breach assembly according to claim 1, further comprising at least one vent hole for release of one or more propellant gases after ignition of the propellant charge.

4. An anti-tamper device for one or more integrated circuits, comprising the breach assembly according to claim 1.

5. The anti-tamper device of claim 4, further comprising an impact element.

6. The anti-tamper device according to claim 5, wherein the impact element is configured to ignite the propellant charge.

7. The anti-tamper device according to claim 5, further comprising a contained energy source that accelerates the impact element into contact with the propellant charge.

8. The anti-tamper device according to claim 4, further comprising a tripping mechanism.

9. A method comprising:
    obtaining a breach assembly comprising:
        a breach element defining a propellant charge chamber to house a propellant charge,
        a slot in the breach element for receiving and housing the one or more integrated circuits, and
        cross ports communicating with the slot and aligned with the propellant charge chamber; and
    installing one or more integrated circuits into the slot in the breach element of the breach assembly,
    placing the breach assembly into a containment chamber and activating the propellant charge to impart a shock wave throughout the breach element, including spalling of the one or more integrated circuits and thereby a breach of the one or more integrated circuits at the cross ports is created.

10. The method of claim 9, wherein the one or more integrated circuits are coupled to a system selected from the group consisting of: a transit system, a banking system, a physical access system, a computer terminal, and a network.

\* \* \* \* \*